United States Patent [19]

Kincaid et al.

[11] Patent Number: 5,432,385
[45] Date of Patent: Jul. 11, 1995

[54] SUPPLEMENTAL INFLATABLE RESTRAINT ENERGY MANAGEMENT AND DEPLOYMENT SYSTEM

[75] Inventors: Kevin D. Kincaid; Richard J. Ravas, Jr.; Mark W. Gose, all of Kokomo, Ind.

[73] Assignee: Delco Electronics Corp., Kokomo, Ind.

[21] Appl. No.: 33,482

[22] Filed: Mar. 18, 1993

[51] Int. Cl.⁶ ............................................. B60R 21/32
[52] U.S. Cl. ................................. 307/10.1; 280/735; 340/436
[58] Field of Search ............... 280/735, 734, 728; 307/10.1; 180/282, 197, 271; 340/436

[56] References Cited

U.S. PATENT DOCUMENTS

| | | | |
|---|---|---|---|
| 4,163,268 | 7/1979 | Spies et al. | 361/1 |
| 4,287,765 | 9/1981 | Kreft | 73/517 |
| 4,410,875 | 10/1983 | Spies et al. | 340/52 |
| 4,497,025 | 1/1985 | Hannoyer | 364/424 |
| 4,980,573 | 12/1990 | White et al. | 307/10.1 |
| 4,987,316 | 1/1991 | White et al. | 307/10.1 |
| 5,037,129 | 8/1991 | Fritz et al. | 280/734 |
| 5,058,920 | 10/1991 | Burger et al. | 280/735 |
| 5,101,115 | 3/1992 | Nitschke et al. | 307/10.1 |
| 5,101,192 | 3/1992 | Ishizuka | 340/436 |
| 5,112,080 | 5/1992 | Okano | 280/735 |

FOREIGN PATENT DOCUMENTS

| | | |
|---|---|---|
| 0284728A1 | 10/1988 | European Pat. Off. |
| 2149158 | 4/1972 | Germany |
| 2808872 | 9/1979 | Germany |
| 3615650 | 12/1987 | Germany |
| 0305656 | 3/1989 | Germany |
| WO89/02377 | 3/1989 | WIPO |
| WO90/02674 | 3/1990 | WIPO |
| WO91/05680 | 5/1991 | WIPO |

Primary Examiner—Thomas M. Dougherty
Assistant Examiner—Aditya Krishnan
Attorney, Agent, or Firm—Anthony Luke Simon; Mark A. Navarre

[57] ABSTRACT

A supplemental inflatable restraint deployment system comprises an energy reserve capacitor, a first supplemental inflatable restraint deployment circuit comprising a controllable current source in series with a first squib, a second supplemental inflatable restraint circuit comprising a second controllable current source in series with a second deployment squib and a control unit for providing a first pulse of first duration to the first controllable current source to activate the first squib and for providing a second pulse of second predetermined duration to the second controllable current source to activate the second squib, wherein the first and second pulses are staggered with respect to each other.

3 Claims, 6 Drawing Sheets

SUPPLEMENTAL INFLATABLE RESTRAINT ENERGY MANAGEMENT AND DEPLOYMENT SYSTEM

The subject of this invention is related to the disclosure of U.S. patent application Ser. No. 07/963,182, filed Oct. 19, 1992, and assigned to the assignee of this invention.

This invention relates to supplemental inflatable restraint systems and, more particularly, to an apparatus and method providing improved energy management of a supplemental inflatable restraint system.

BACKGROUND OF THE INVENTION

In some existing supplemental inflatable restraint systems, one or more electromechanical sensors sense sudden deceleration of a vehicle and close electrical contacts to initiate desired deployment of a supplemental inflatable restraint system. When the contacts close, current flows through the contacts and through the supplemental inflatable restraint deployment squib. To ensure rapid deployment of the system, a high level of current flows through the sensors and squib. The high level of current flow through the sensor often causes arcing of the sensor, which arcing may damage the electromechanical sensor and make it unsuitable for re-use.

In the case of a battery disconnect during an event for which deployment of the supplemental inflatable restraint system is desired, reserve capacitors are used as temporary energy storage devices to supply the energy necessary to deploy the supplemental inflatable restraint system. Typically, the reserve capacitors are several large capacitors. For example, a supplemental inflatable restraint system may have one reserve capacitor for the control unit and one for each squib to be activated.

What is desirable is a supplemental inflatable restraint system with reusable electromechanical actuators. Also what is desirable is a supplemental inflatable restraint system with improved energy management enabling both a reduction in the number of capacitors necessary and a reduction in the size of the capacitors required by the system without a reduction in system performance.

SUMMARY OF THE PRESENT INVENTION

The apparatus and method of this invention provide a supplemental inflatable restraint system with reusable switching components and improved reserve energy management.

This invention provides an apparatus and method for controlling a supplemental inflatable restraint system that activates the system without causing arcing of an electromechanical sensor.

Advantageously, the apparatus of this invention controls current flow through a deployment squib by use of a switchable current source controlled by a control line, removing the final switching of the current from the contacts of the electromechanical actuator to the switchable current source. Advantageously, the apparatus of this invention efficiently uses energy of the system storage capacitor by pulsing the controllable current source for a limited time period, which limited time period is long enough to ensure deployment of the supplemental inflatable restraint system, but of finite duration to prevent unnecessary discharging of the storage capacitor.

Advantageously, the apparatus of this invention allows the use of a smaller energy reserve capacitor for the supplemental inflatable restraint system. Advantageously, the apparatus of this invention prevents unnecessary drainage of the reserve capacitor during deployment of a supplemental inflatable restraint system.

Advantageously, the apparatus of this invention provides a microprocessor controller and one or more supplemental inflatable restraint deployment circuits all utilizing a single capacitor for energy storage and use during battery disconnect.

Advantageously, the apparatus of this invention provides a multiple deployment supplemental inflatable restraint system with staggered deployment of the supplemental inflatable restraints. Advantageously, the staggered deployment of this invention allows use of a smaller reserve capacitor and or reserve capacitor voltages and provides more efficient use of the energy storage device.

Advantageously, the apparatus of this invention comprises a vehicle supply voltage source and a means, coupled between the vehicle supply voltage source and an energy reserve capacitor, for generating a high voltage level to which the energy reserve capacitor normally charged. A first diode is coupled between the reserve capacitor and a supply node and a second diode is coupled between the vehicle voltage supply and the supply node. A series circuit coupled between the supply node and ground comprises a controllable current source in series with a squib. A regulated voltage supply is coupled to the first node and supplies a regulated voltage to a microprocessor controller. The microprocessor controller has a control output coupled to the controllable current source and comprising means for controlling the controllable current source to deploy the supplemental inflatable restraint system when desired, wherein, in the event of disconnect of vehicle supply voltage source, the reserve capacitor powers the regulated voltage supply, the microprocessor controller, the controllable current source and the squib.

Advantageously, the apparatus of this invention comprises a reserve capacitor, a first controllable current source in series with a first squib and a second controllable current source in series with a second squib. A microprocessor controller responsive to a sudden deceleration of the vehicle comprises means for pulsing the first controllable current source to deploy the first supplemental inflatable restraint, means for delaying deployment of the second current source for a predetermined time period after the first current source is shut off and means for pulsing the second controllable current source deploying the second supplemental inflatable restraint after the delay.

Advantageously, the apparatus of this invention comprises an energy reserve capacitor and a series circuit coupled to the energy reserve capacitor, the series circuit comprising a controllable regulated current source, a deployment squib and an electromechanical actuator.

A more detailed description of this invention, along with various embodiments thereof, is set forth below.

DETAILED DESCRIPTION OF THE INVENTION

Figure 1:
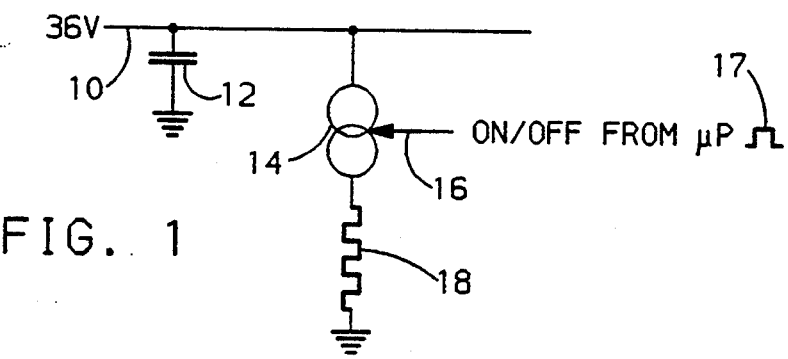
FIG. 1 illustrates an implementation of the apparatus of this invention.

Referring to FIG. 1, the apparatus of this invention shown includes reserve capacitor 12 normally charged to a predetermined voltage level through a power supply coupled to line 10. The predetermined voltage level is set to ensure storage of sufficient energy in capacitor 12 to operate the supplemental inflatable restraint system for a short time period after a battery disconnect in a deployment situation. An example voltage level is 36 volts.

A series circuit comprising controllable current source 14 and squib 18 is coupled across capacitor 12 and powered thereby in the event of battery disconnect. Controllable current source 14 has a line 16 coupled to a control unit (not shown) and, responsive to a control signal on line 16, is switchable between states of supplying no current to squib 18 and supplying a regulated activation current to squib 18 to deploy the supplemental inflatable restraint system.

In accordance with the apparatus of this invention, controllable current source 14 is controlled by a pulse 17, on line 16, of predetermined duration. In response to the pulse of predetermined duration, current source 14 supplies current to squib 18 for a predetermined amount of time, which current and predetermined amount of time is sufficient to activate squib 18 and deploy the supplemental inflatable restraint system if necessary. Through use of a predetermined pulse time and a controllable current source of known characteristic, the amount of power used by capacitor 12 during deployment can be predetermined and can be more efficiently managed allowing for capacitor 12 to be of smaller size due to elimination of wasted reserve energy.

Figure 10:
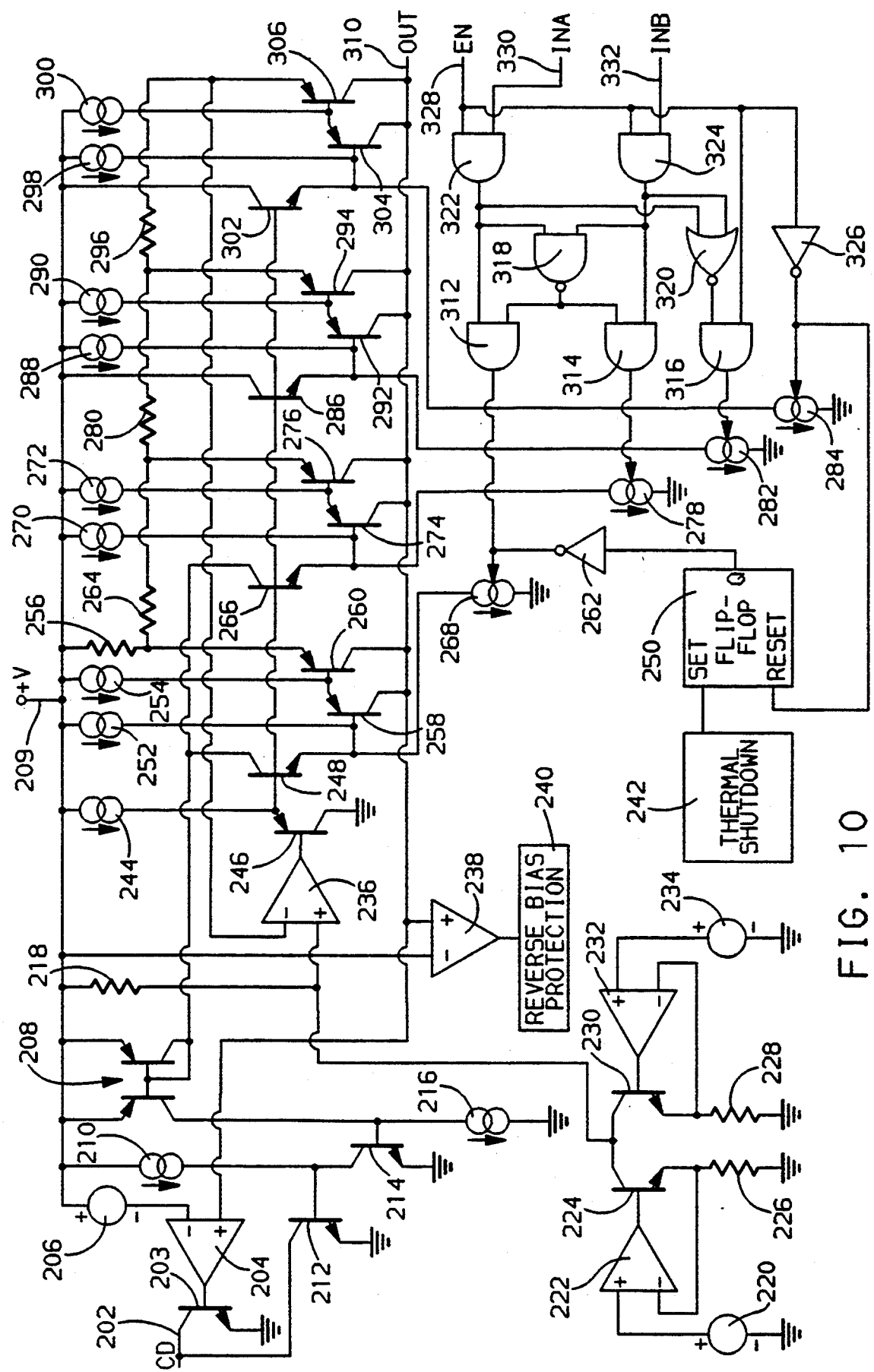
FIG. 10 illustrates a controlled current source according to this invention.

Controllable current source 14 may be any controllable current source such as a transistor, a transmission gate or preferably according to this invention, a regulated current source as shown in FIG. 10 and described in detail further below. The current source shown in FIG. 10 is controllable by multiple control lines coupled to a control unit or microprocessor and provides a regulated, steady current, i.e., 2 amperes, from energy stored in the reserve capacitor. The duration of current supply is determined by the size and initial voltage level of the energy reserve capacitor. Suitable implementations have used both 22 volts and 36 volts, but the initial voltage level of the reserve capacitor may be set at any level as desired by a system designer.

Figure 2:
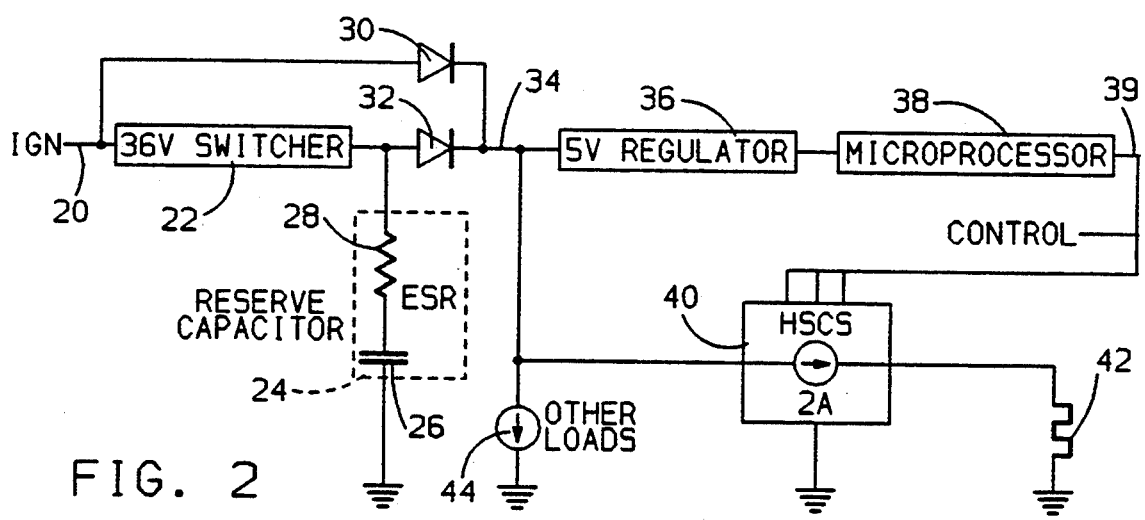
FIG. 2 schematically illustrates a circuit apparatus according to this invention.

Referring now to FIG. 2, a schematic structure of this invention is shown for implementing a single reserve capacitor 24 as the reserve energy source for 5 volt regulator 36, microprocessor 38, current source 40 and squib 42 during a deployment event in which the vehicle supply voltage is cut off.

In the apparatus shown, the vehicle supply voltage is supplied on line 20 from the vehicle power supply and coupled through diode 30 to node 34 from which the 5 volt regulator 36 and the controllable current source 40 receive power. Reference 44 indicates that other loads, such as further deployment loops or diagnostic circuitry, may be attached to node 34. The regulated power supply 36 provides a regulated 5 volts to microprocessor 38, which controls current source 40 through line 39.

Voltage step-up circuit 22 is coupled between ignition voltage source on line 20 and reserve capacitor 24, here represented by its internal capacitance 26 and its equivalence series resistance (ESR) 28. The equivalence series resistance 28 occurs during cold operation and is effectively 1.5 to 2 ohms for a 4,700 uF aluminum electrolytic capacitor.

Normally, the output voltage of voltage step-up circuit 22 is greater than the ignition voltage supplied to line 20, therefore the regulating voltage supply 36 and current source 40 receive power through diode 32. Diode 30 provides a redundant path for power in the event of a failure in voltage step-up circuit 22. When necessary, reserve capacitor 24 powers voltage regulator 36, microprocessor 38, current source 40 and squib 42 via diode 32.

Figure 3A:
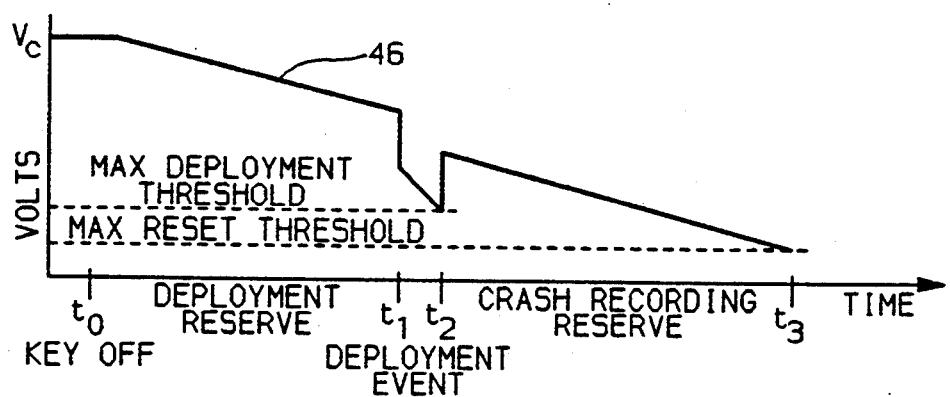
FIG. 3A illustrates the voltage across the reserve capacitor during a deployment event during which the vehicle supply voltage is interrupted.

Referring now to FIG. 3A, the voltage across capacitor 24 is represented by reference 46 during a deployment event with a time, $t_0$, at which the vehicle supply voltage is cut off from the supplemental inflatable restraint system. Between time $t_0$ and $t_1$, the microprocessor 38 is processing the data of a sudden deceleration event for which its internal discriminating programming determines whether deployment of the supplemental inflatable restraint system is necessary.

Figure 3B:
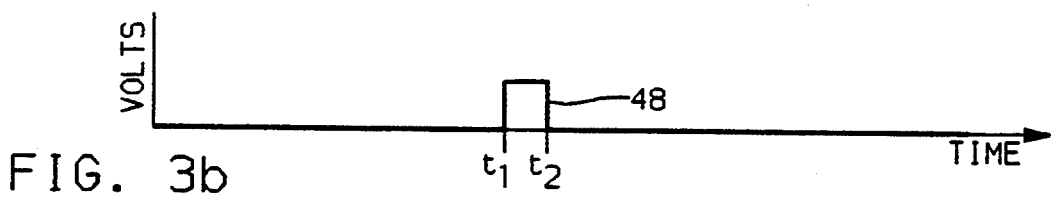
FIG. 3B illustrates a controlled pulse for controlling a controllable current source according to this invention.

At time $t_1$, which microprocessor 38 determines is the optimal time to activate current source 40, a pulse represented by reference 48 (FIG. 3B) is applied to the control input of current source 40 to drive squib 42. The pulse at current source 40 has a predetermined time length between times $t_1$ and $t_2$, which time length is known to be sufficient to activate the squib 42. For example, for a squib rated for 2 ms of 2 amperes of current, a constant current of 2 amperes is desired to be provided for 2.5 ms. Therefore, the time period between $t_1$ and $t_2$ is 2.5 milliseconds.

During the time period between $t_0$ and $t_1$, microprocessor 38 runs from power supplied by reserve capacitor 24, slowly draining the reserve capacitor energy, as shown by the gradual decline in voltage across the reserve capacitor. At time $t_1$, when current source 40 is activated, the large 2 ampere current draw by current source 40 causes the instantaneous voltage drop across the effective ESR resistance 28 to rise, which in turn causes a drop in capacitor voltage, as shown.

Due to the increased current draw from energy reserve capacitor 24 when current source 40 is activated, energy reserve in capacitor 24 decreases at a faster rate between time $t_1$ and $t_2$ than before time $t_1$ or after time $t_2$. At time $t_2$, the signal on line 39 shuts off current source 40. When current source 40 shuts off, the reduction in the load across the ESR 28 of capacitor 24 results in a rise of the voltage across capacitor 24, as shown at time $t_2$.

The remaining energy reserve of capacitor 24 powers microprocessor 38, which records the deployment event until time $t_3$, when capacitor 24 no longer has sufficient power to power microprocessor 38. Ideally, the time $t_0$ to $t_3$ is at least 500 ms.

Figure 4:
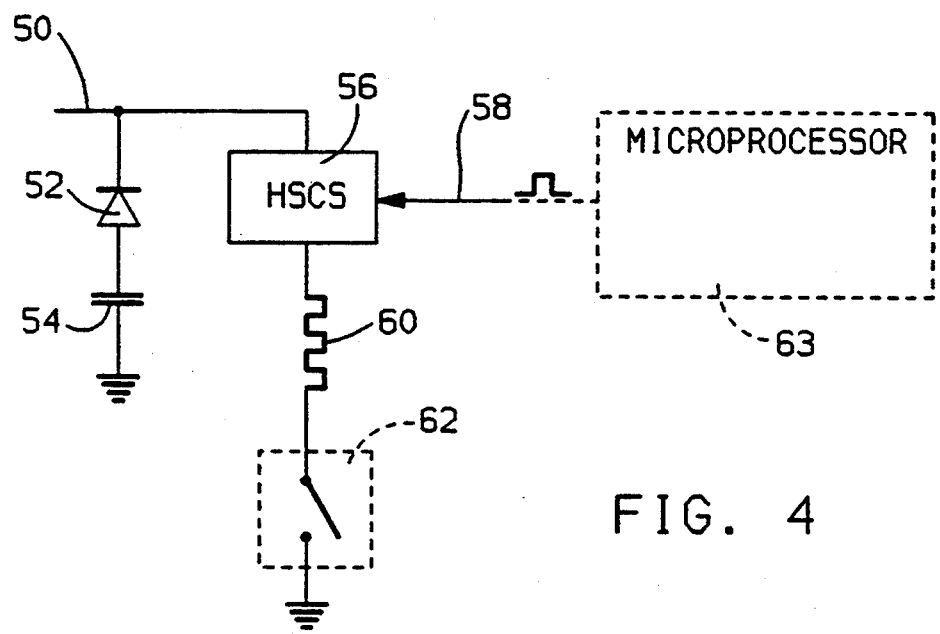
FIG. 4 illustrates a deployment circuit according to the apparatus of this invention.

Referring to FIG. 4, the circuit apparatus of this invention is shown comprising, in series, controllable current source 56 connected to squib 60, which is connected to electromechanical sensor 62. The whole series circuit is connected between the current supply line 50 and ground. Actuation current is provided on line 50 either from the vehicle power supply or from energy reserve capacitor 54 through diode 52. Controllable current source 56 is controlled through line 58 with a pulse of predetermined duration from a control unit such as microprocessor controller 38 in FIG. 2. Electromechanical sensor 62 may be any electromechanical sensor known to those skilled in the art for signaling sudden deceleration of a vehicle, as a result of which it is desirable to deploy the supplemental inflatable restraint system.

The advantage of the circuit apparatus shown on FIG. 4 is two fold. First, two criteria are required to deploy a supplemental inflatable restraint. The first criteria is the closing of electromechanical sensor 62, which is time proven and reliable in both its simplicity and accuracy. The second criteria is a decision by the system controller to provide a pulse on line 58. The decision by the controller may be responsive to a second acceleration sensor, such as a continuous range transducer type. The two criteria provide a unique redundancy in decision making. The first decision being at the closure of the electromechanical sensor 62 and the second decision being to provide a pulse on line 58. This system helps prevent undesirable deployment of the system by requiring a redundant decision and by providing a system for which a single mode of failure cannot cause deployment of the supplemental inflatable restraint.

A second advantage of the apparatus shown in FIG. 4 is an implementation of electromechanical sensor 62 that doesn't destroy the switch contacts of sensor 62 through arcing upon closing. More particularly, this system may be implemented so that during a sudden deceleration of the vehicle, during which it is desirable to deploy the supplemental inflatable restraint system, the electromechanical sensor 62 closes before a pulse is provided on line 58 to the controllable current source 56. In such an implementation, when electromechanical sensor 62 closes, there is no current supplied by the controllable current source 56 and therefore no current to arc the electrodes of the switch of sensor 62. After a very short delay, the system controller then provides a pulse on line 58 to controllable current source 56, which responsively sends current to the squib 62, which current travels to ground through sensor 62 providing deployment of the supplemental inflatable restraint system.

Figure 5:
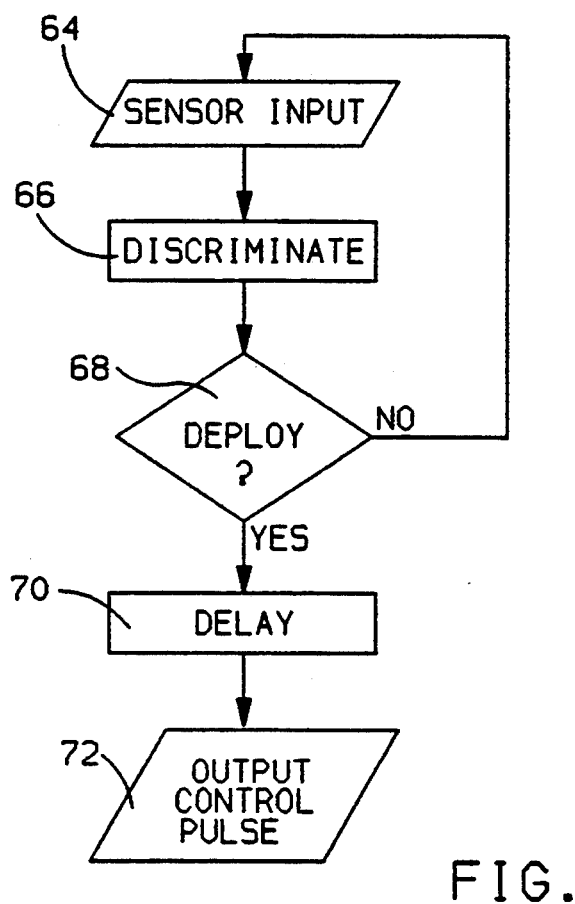
FIG. 5 is a flow diagram for the supplemental inflatable restraint system controller according to this invention.

FIG. 5 illustrates a flow diagram for a control routine for implementation of this invention as described above. At block 64 the controller receives sensor inputs indicative of the accelerative state of the vehicle. The sensor inputs may be provided from an acceleration sensor in a manner well known to those skilled in the art. Known acceleration sensors include semiconductive, piezoresistive and capacitive devices which output signals proportional to the acceleration of the vehicle, and also include, more simply, two-state acceleration sensors such as electromechanical devices of the type used as sensor 62 in FIG. 4.

In response to the sensor inputs, the controller discriminates the input signal in a manner well known to those skilled in the art at block 66 to determine if the supplemental inflatable restraint system should be deployed. At block 68, if a deployment decision has not been made, the routine moves back to block 64 to await new sensor input data. If a deployment decision is made, the routine moves to block 70 where a slight delay on the order of 100 microseconds occurs to allow full closing of the electromechanical sensor 62 and/or to optimize the time of deployment. At block 72, the control pulse is provided to the controllable current source, such as current sources 14, 40 and 56 described above, to deploy the supplemental inflatable restraint system. The pulse output at block 72 has a predetermined duration to drain only a predetermined amount of stored energy from the energy reserve capacitor.

Figure 6:
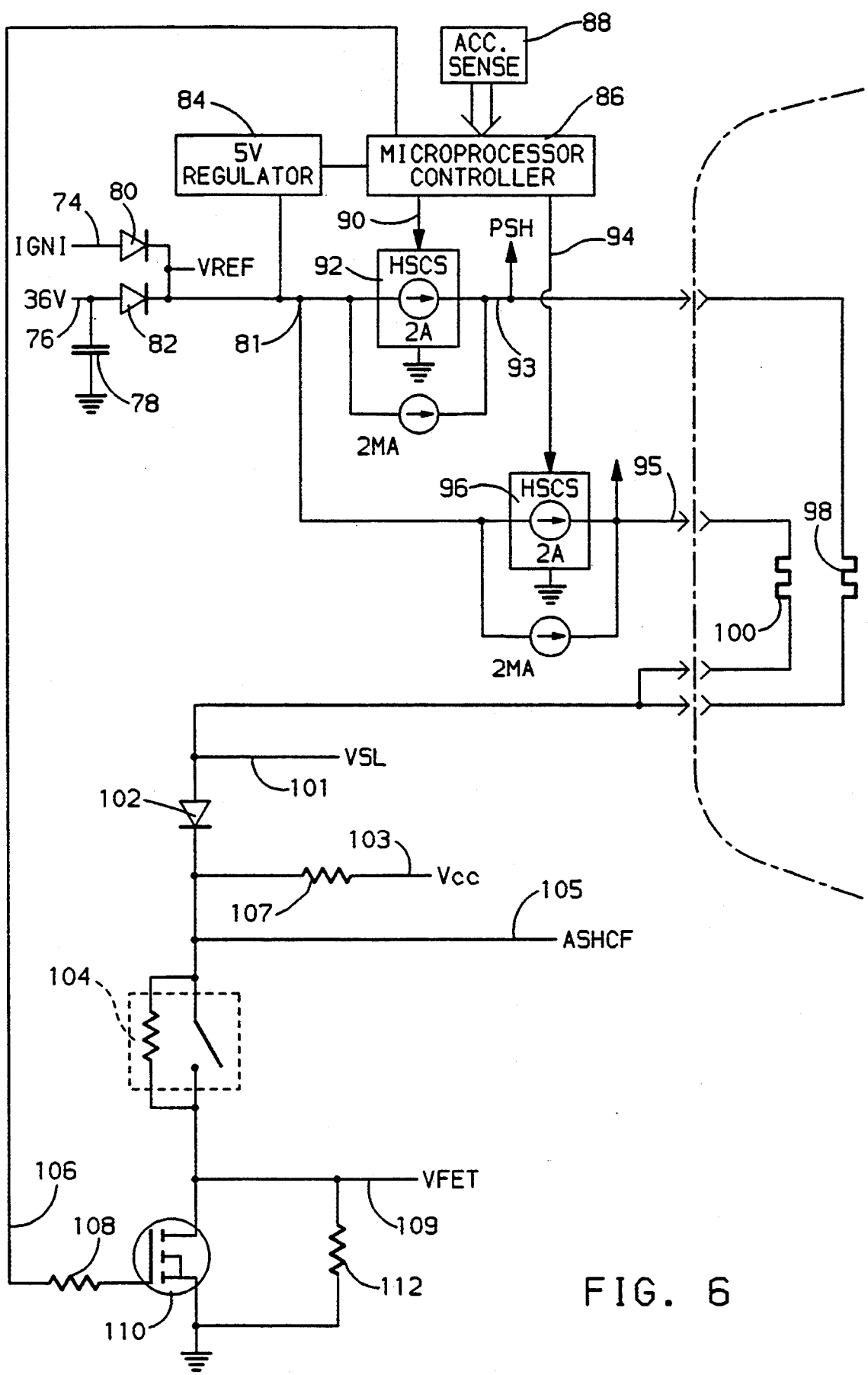
FIG. 6 illustrates a multiple supplemental inflatable restraint deployment system according to this invention.

Referring to FIG. 6, a multiple unit supplemental inflatable restraint system according to this invention is shown. The system shown includes microprocessor 86, regulated voltage supply 84, controllable current sources 92 and 96, deployment squibs 98 and 100, electromechanical actuator 104 and FET 110.

In general, the system shown is powered from the 36 volt supply voltage on line 76 through diode 82, which 36 volt supply voltage is provided by a voltage step-up circuit (not shown) coupled to the vehicle supply voltage. In the event of disconnect of the vehicle supply voltage, capacitor 78, normally charged to 36 volts by line 76, is used as the energy reserve for the system, providing power through diode 82 to node 81. Voltage regulator 84, coupled to node 81, provides a regulated voltage to microprocessor 86, providing power to microprocessor 86 during both normal operating conditions and conditions during which there is a battery disconnect but reserve energy in capacitor 78.

Microprocessor 86 processes sensor information and generally monitors the state of the supplemental inflatable restraint system. Sensor monitoring and deployment determination is implemented in manners well known to those skilled in the art, and may be responsive to an acceleration sensor 88 of a type well known to those skilled in the art.

Lines 101, 105 and 109 are implemented for diagnosis of the system. During system diagnostics, a small current is provided on lines 93 and 95 and the voltage levels on lines 105 and 109 are monitored to determine whether or not a disconnect has occurred somewhere in the electromechanical actuator circuit. Also, during a deployment event, lines 93, 95, 101, 105 and 109 provide signals to microprocessor 86 for recording of the deployment event.

During a sudden deceleration of the vehicle for which it is desirable to deploy the two supplemental inflatable restraints, electromechanical actuator 104 closes. Also in response to the sudden deceleration, microprocessor 86 outputs a signal on line 106 via resistor 108 to FET 110, forward biasing FET 110 so that current may flow from actuator 104 to ground. The microprocessor then provides, through lines 90 and 94, current pulses of predetermined duration to activate the controllable current sources 92 and 96, activating squibs 98 and 100 respectively.

Figure 7:
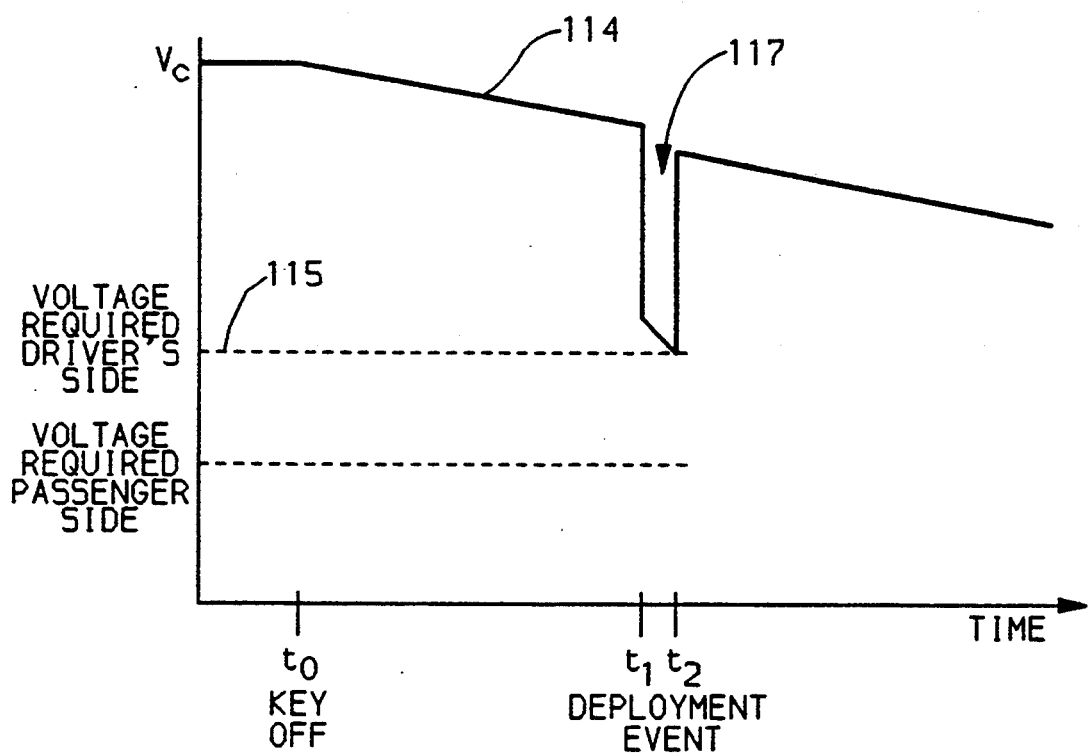
FIGS. 7 and 8 illustrate energy management of a reserve capacitor during deployment of multiple supplemental inflatable restraints.
Figure 8:
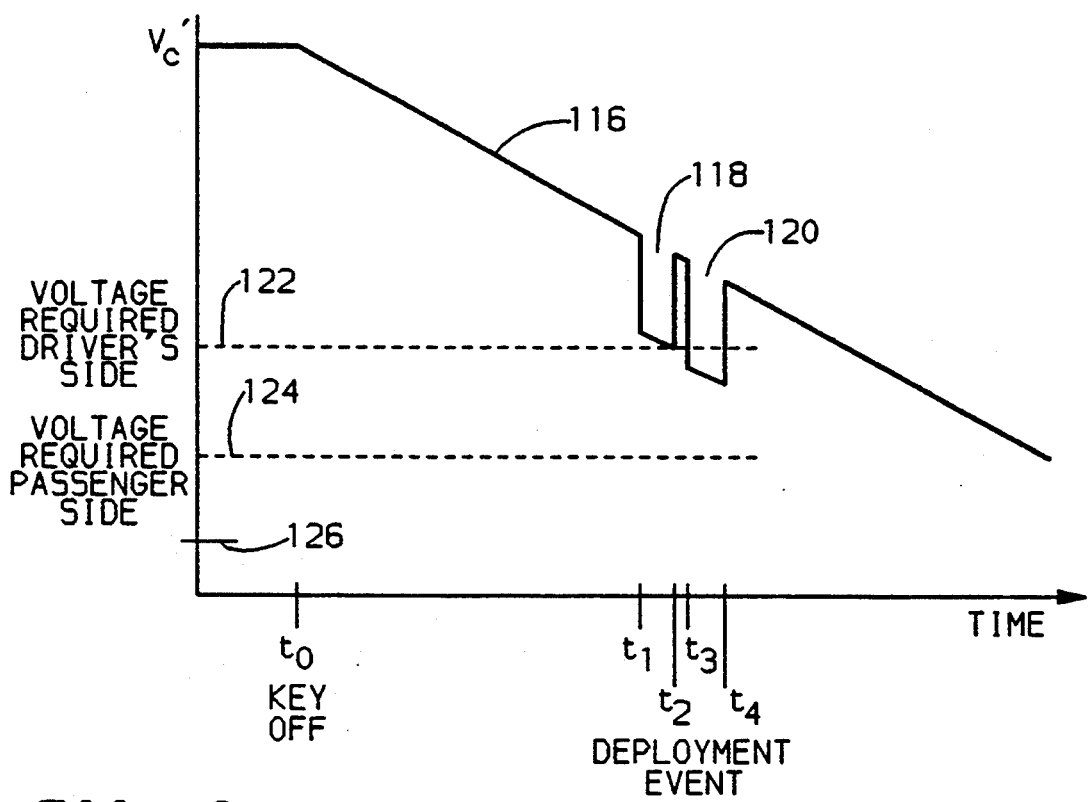

Referring to FIGS. 7 and 8, energy management of the reserve capacitor for the system shown in FIG. 6 may be understood. In FIG. 7, reference 114 illustrates the voltage across the reserve capacitor during a deployment condition in which the vehicle supply voltage is disconnected and in which both driver and passenger squibs are activated at the same time. During activation of the two squibs, the sudden current draw through the system causes a large voltage drop in capacitor 78 due to the high current draw across the ESR of capacitor 78 between times $t_1$ and $t_2$, as shownby portion 117 in the Figure.

In order to maintain the required current to current sources 92 and 96, capacitor 78 must be charged at a high enough voltage and be of large enough size so that from the entire time period from $t_1$ to $t_2$ there is enough voltage across capacitor 78 to ensure that each of the current sources 92 and 96 provide sufficient amount of current to the squibs 98 and 100 for a sufficient amount of time. Line 115 represents the minimum acceptable voltage across capacitor 78 during deployment of the squibs.

Referring now to FIG. 8, according to this invention, staggered deployment of the squibs 98 and 100 occurring at times $t_1$ and $t_3$, allows for more efficient energy management of the reserve capacitor 78, a lower capacitor charge voltage Vc' and a smaller size capacitor 78.

Reference 116 illustrates the voltage across capacitor 78 during a deployment condition after disconnect of the vehicle supply voltage at time $t_0$. Reference 122 represents the minimum voltage required to individually deploy the driver-side squib and reference 124 represents the minimum voltage across capacitor 78 to individually deploy the passenger-side squib. Minimum voltage levels 122 and 124 are different because, in many systems, the driver-side and passenger-side total impedance are different and therefore require different voltage levels to ensure the 2 amperes of current during deployment. If, however, the driver-side and passenger-side circuits are of the same impedance, references 122 and 124 will be at identical levels.

In FIG. 8, the capacitor is initially charged to its normal voltage level of Vc', for example 36 volts, until at time $t_0$ the vehicle voltage supply is disconnected due to a sudden deceleration of the vehicle. From the time $t_0$ to $t_1$, the microprocessor processes the sensor inputs and decides to deploy the supplemental inflatable restraint system. From time $t_1$ to time $t_2$, a pulse is provided on line 94 to current source 96, which pulse provides at least two amperes of current to squib 100 for the limited time period between $t_1$ and $t_2$. At time $t_2$, the pulse on line 94 is terminated and after a short delay before time $t_3$, a pulse on line 90 is provided to current source 92, which provides 2 amperes of current to passenger squib 98 to deploy the passenger-side supplemental inflatable restraint. The pulse on line 90 is provided from time $t_3$ to time $t_4$ and is terminated at time $t_4$, terminating current flow through current source 92. From time $t_4$ until the voltage across capacitor 78 reaches level 126, the microprocessor 86 continues to function from the reserve energy in capacitor 78 and records the signal levels during the deployment event.

An advantage achieved by staggered deployment of the supplemental inflatable restraint system is a lower necessary voltage across the energy reserve capacitor. When two squibs are simultaneously activated, the current draw from capacitor 78 is doubled. Likewise, the effect of ESR in capacitor 78 is increased, causing a large voltage drop at time $t_1$ in FIG. 7. However, when the squibs are activated independently, the current draw is limited to half the simultaneous activation current, which limits the effect of ESR in capacitor 78, and resultingly limits the voltage drops occurring at times $t_1$ and $t_3$ in FIG. 8. The smaller voltage drops occurring during deployment reduces the necessary charge voltage across capacitor 78 immediately before deployment.

Figure 9:
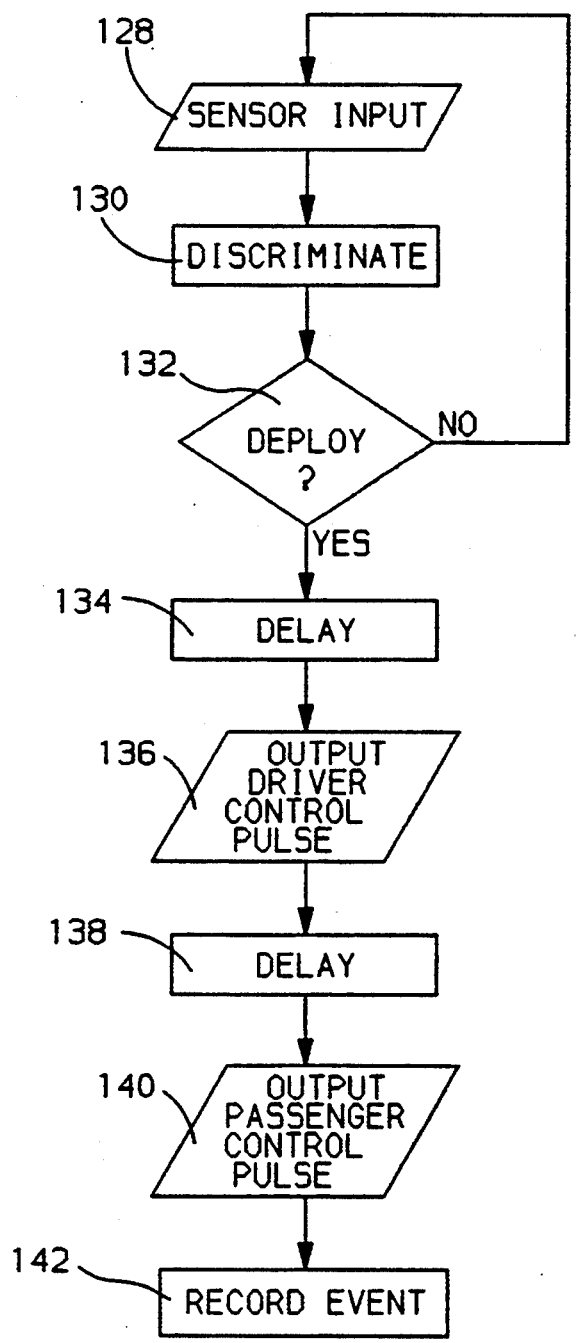
FIG. 9 is a flow diagram for a control unit controlling deployment of multiple supplemental inflatable restraints according to this invention.

Referring to FIG. 9, a flow routine for the implementation of this invention shown in FIGS. 6 and 8 is set forth. At blocks 128, 130 and 132, the microprocessor control unit 86 receives sensor input from sensors monitoring a deceleration of the vehicle, discriminates the input signals (block 130) and decides to deploy or not to deploy the supplemental inflatable restraint system (block 132). The routine moves through block 134 where a slight delay is provided to ensure closing of the electromechanical sensor 104 and to optimize deployment time of the supplemental inflatable restraint system. At block 136, a control pulse of limited duration is provided on line 94 to controllable current source 96, activating driver-side squib 100, which deploys driver-side supplemental inflatable restraint.

At block 138, a very short delay is incorporated to separate the deployment of the driver-side squib and the deployment of the passenger-side squib at block 140. At block 140, a pulse of limited duration is provided on line 90 to controllable current source 92, which provides 2 amperes of current to passenger-squib 98, activating squib 98 and deploying the passenger-side supplemental inflatable restraint. In this manner of providing the output pulses to the controllable sources 92 and 96 for limited durations and in a staggered manner, the energy of capacitor 78 can be efficiently managed and the power drainage from capacitor 78 can be predetermined for deployment.

At block 142, the microprocessor 86 continues to function from the reserve energy in capacitor 78, recording the signal levels in the supplemental inflatable restraint system until capacitor 78 no longer has sufficient energy to power microprocessor 86. Example pulse durations of the control pulses to the controllable current sources are 2.5 milliseconds.

Staggering the deployment in the system shown on FIG. 6 reduces the current draw from capacitor 78 at any single deployment time from, for example, 4.4 amperes to 2.2 amperes (approximations including a safety margin). The drop in the capacitor voltage during deployment, for example references 117, 118 and 120 in FIGS. 7 and 8, is due to the ESR of the capacitor that occurs during a high current draw condition. The voltage required by capacitor 78 for simultaneous deployment, such as illustrated in FIG. 7, is equal to:

$$V_{req} = V_{as} + V_{dr} + V_{sat} + V_{esr}.$$

where $V_{as}$ is the voltage drop across the electromechanical sensor, $V_{dr}$ is the voltage drop across the driver side deployment circuit, $V_{sat}$ is the current source saturation voltage drop and $V_{esr}$ is the voltage drop due to the capacitor's ESR. Assuming a sensor impedance of 0.075 ohms, a driver side circuit impedance of 3.435 ohms, a saturation voltage for the current source of 2 volts and an ESR of 1.5 ohms, the required voltage, $V_{req}$, is 16.577 volts.

Assuming a voltage droop during energy reserve time of (0.18 Amp-seconds)/C, a voltage droop during simultaneous deployment of (4.46 Amps* 0.002 seconds)/C, and an initial voltage of 33.15 volts, the minimum capacitance for capacitor 78 can be shown to be 11,399 Uf.

However, for staggered deployment:

$$V_{req} = V_{as} + V_{dr} + V_{sat} + V_{esr},$$

where only 2.2 amperes of current is flowing through the sensor and deployment circuit and 2.26 effectively across the ESR, $V_{req}$ can be shown to equal 13.112 volts. Assuming a voltage droop during driver side deployment of (2.26 amps * 0.002 seconds)/C, and everything else similar to the simultaneous example above, the minimum capacitance for capacitor 78, according to this invention, can be shown to be 9,209 Uf. Since the passenger deployment circuit impedance is less than the driver deployment circuit impedance, the passenger side circuit would require an even smaller capacitor 78. However, the circuit with the highest impedance determines the actual minimum capacitance to be used. Thus, in this example, the invention provides a reduction of almost 20% in the minimum required capacitance for capacitor 78.

As can be seen, staggering the deployment according to this invention results in a decreased capacitor size for the energy reserve capacitor. If desired, capacitor size may be traded off against initial charge voltage, i.e., a higher initial charge voltage results in a reduced necessary capacitor size. The above computations are for an example implementation of this invention and are not limiting on the scope thereof.

Referring to FIG. 10, a preferred implementation of the controlled current source according to this invention is shown. Line 209 is coupled to the current supply, for example, line 34 in FIG. 2, and output line 310 connects to and powers the squib, such as squib 42 in FIG. 2. The controlled current source works as follows.

Lines 328, 330 and 332, the ENABLE, INPUT A and INPUT B lines, control logic gates 312–326 to selectively turn on the IC current sources 268, 278, 282 and 284 in the manner described below to control the circuit's 2 A, 150 mA, 10 mA and 2 mA current sources. Current sources 268, 278, 282 and 284 act as current sinks for transistors 248, 266, 286 and 302 whose emitters are coupled to the Darlington pair transistors (258, 260), (274, 276), (292, 294) and (304, 306) as shown. Turning off current sources 268, 278, 282 and 284 turns off their above-mentioned Darlington pair transistors, thereby turning off the power supplies.

Resistors 256, 264, 280 and 296 in series act as the current sensing resistors for the current source. Resistor 256 controls the 2 amp output of transistors 258 and 260 to line 310. The series combination of resistors 256 and 264 controls the 150 milliamp output of transistors 274 and 276 to line 310. The series combination of resistors 256, 264 and 280 controls the 10 milliamp output of transistors 292 and 294 to line 310 and the series combination of resistors 256, 264, 280 and 296 controls the 2 milliamp output of transistors 304 and 306 to line 310. The Darlington transistors are biased through current sources 252, 254, 270, 272, 288, 290, 298 and 300 as shown.

The circuit comprising amplifiers 222 and 232, biased by voltage bias sources 220 and 234, control transistors 224 and 230 to set up a bias voltage across resistor 218. Resistors 226 and 228 may trimmed to set the bias voltage and resistor 226 may be temperature-sensitive to provide temperature stabilization to the circuit.

In brief, regulated current is provided on line 310 by maintaining the voltage drop across resistors 256, 264, 280 and 296 (the sense resistors) equal to the bias voltage across resistor 218, which may also be a trimmable resistor. Amplifier 236 is responsive to the error between the bias voltage across resistor 218 and the voltage across the resistor series of the sense resistors and controls transistor 246 in response.

Transistor 246 is operatively associated with current source 244 and controls the control transistors 248, 266, 286 and 302. When the current across the sense resistors 256, 264, 280 and 296 is greater than desired, the resultant increased voltage drop across the sense resistors raises the output of amplifier 236, partially shutting off transistor 246. Transistor 246, in turn, partially turns on control transistors 248, 266, 286 and 302, which affects a regulation of the current output of the Darlington pair transistors (258, 260), (274, 276), (292, 294), and (304, 306).

The logic of the circuit operates as follows. When line 328 is low, only the 2 milliamp current output from transistors 304 and 306 is enabled. When line 328 is high and lines 330 and 332 are low, only the 10 milliamp output of Darlington transistors 292 and 294 is enabled. When line 328 is high, line 330 is low and line 332 is high, only the 150 milliamp output of Darlington transistors 274 and 276 to line 310 is enabled. When line 328 is high, line 330 is high and line 332 is low, only the 2.11 amp output of Darlington transistors 258 and 260 to line 310 is enabled. When all three lines 328, 330 and 332 are high, all of the current sources are off.

Current mirror 208 supplies current to transistors 248 and 266 and is, itself, biased by current source 216. Line 202 is normally high during standard operation of the circuit and is biased by current source 210 and transistors 212 and 214. However, operational amplifier 204, with the inverting input biased by voltage bias 206, is responsive to the output voltage level of line 310 which, when rising above the bias level set by voltage bias 206, indicates that the circuit is in saturation and cannot provide the regulated current output. In such a state, transistor 203 is forward biased bringing line 202 low for an indication of circuit saturation.

Reverse bias shut down is provided by amplifier 238 and block 240. When the current source is reverse biased, line 310 rises above the voltage at line 209. This causes a high output from amplifier 238 which triggers bias shut down circuitry 240, which is standard circuitry easily implemented by those skilled in the art, to shut down operation of the IC.

Block 242 is a standard thermal-sensitive circuit which controls thermal shut down of the IC. Block 242 includes a temperature sensitive VVE transistor coupled to a voltage comparator that outputs a high signal when the temperature of the circuit rises above 150° Celsius. Such circuits are standard and well known to those skilled in the art. The high signal from block 242 sets flip-flop 250 whose output, inverted by invertor 262, shuts down current source 268 inhibiting output of the 2 amp current source transistors 258 and 260. Flip-Flop 250 cannot be reset until line 328 goes low and then goes high again. Given a supplemental inflatable restraint system in which the squib is designed to be activated after 2 millisecond of 2 ampere current. Thermal shut down should be set so as to not occur for at least 4–7 milliseconds of operation of the 2 amp current source.

In normal operation, the 2 milliamp current source is activated to set up a bias through the supplemental inflatable restraint system for system diagnostic purposes. The 150 milliamp current source may be activated with the 1 Hz., 5% duty cycle square wave for 4 pulses after every ignition cycle to test the impedance of the squib. The circuit in FIG. 10 may be easily implemented by those skilled in the art to be controlled by a microprocessor or other type of control unit, given the above description.

The above implementations of this invention are example implementations of which many circuit equivalents may be substituted by those skilled in the art. Moreover, various improvements and modifications to this invention may occur to those skilled in the art and such improvements and modifications will fall within the scope of this invention, as set forth below.

The embodiments of the invention in which an exclusive property or privilege is claimed are defined as follows:

1. An apparatus for the deployment of first and second supplemental inflatable restraints having first and second deployment squibs, comprising:

an energy reserve capacitor for supplying current to the first and second deployment squibs via first and second controllable current sources;

a first deployment circuit including said first controllable current source for supplying current from said energy reserve capacitor to said first deployment squib;

a second deployment circuit including said second controllable current source for supplying current from said energy reserve capacitor to said second deployment squib;

means for providing a first pulse of a first predetermined period to the first controllable current source to activate the first squib for said first period; and means for providing a second pulse of a second predetermined period to the second controllable current source to activate the second squib for said second period, the first and second pulses being staggered with respect to each other.

2. A method of deploying first and second air bags with an energy reserve capacitor, each air bag having an associated deployment circuit including a deployment squib, the method comprising the steps of:

sensing a vehicle deceleration in excess of a threshold value;

responsive to the sensed deceleration, providing a first current pulse of first predetermined duration to a first controllable current source to activate the deployment squib associated with said first air bag with deployment current from said energy reserve capacitor;

terminating the first current pulse; and after termination of the first current pulse, providing a second current pulse of second predetermined duration to a second controllable current source to activate the deployment squib associated with said second air bag with deployment current from said energy reserve capacitor, thereby to reduce the instantaneous deployment current supplied by the energy reserve capacitor.

3. A deployment circuit for at least two air bags, each air bag including a deployment squib and a current source controllable to supply deployment current to the respective deployment squib, the improvement wherein:

the deployment currents supplied to the deployment squibs are sourced from a single energy reserve capacitor and, in the event of a deployment event, the current sources for the air bags are activated in sequence, allowing the energy reserve capacitor to activate one deployment squib before activating the other deployment squib, thereby preventing simultaneous supply of deployment current to more than one deployment squib.

* * * * *